United States Patent
Wang et al.

(10) Patent No.: US 10,228,468 B1
(45) Date of Patent: Mar. 12, 2019

(54) METHOD AND APPARATUS FOR MULTIPATH DETECTION

(71) Applicant: Marvell International Ltd., Hamilton (BM)

(72) Inventors: Yongsong Wang, Shanghai (CN); Zhike Jia, Fremont, CA (US); Jian Cheng, Shanghai (CN); Jiangping Deng, Shanghai (CN); Feng Xu, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 312 days.

(21) Appl. No.: 15/211,009

(22) Filed: Jul. 15, 2016

Related U.S. Application Data

(60) Provisional application No. 62/196,420, filed on Jul. 24, 2015.

(51) Int. Cl.
*G01S 19/22* (2010.01)
*G01S 19/23* (2010.01)

(52) U.S. Cl.
CPC ............ *G01S 19/22* (2013.01); *G01S 19/235* (2013.01)

(58) Field of Classification Search
CPC ........ G01S 19/22; G01S 19/235; G01S 19/18; G01S 19/29; G01S 19/30; G01S 13/003
USPC ..................................................... 342/357.61
See application file for complete search history.

(56) References Cited

U.S. PATENT DOCUMENTS

| 5,907,578 A * | 5/1999 | Pon ......................... G01S 19/22 342/352 |
| 5,949,815 A * | 9/1999 | Pon ......................... G01S 19/30 375/150 |
| 5,966,403 A * | 10/1999 | Pon ......................... G01S 19/22 375/148 |

\* cited by examiner

*Primary Examiner* — Harry K Liu

(57) ABSTRACT

Aspects of the disclosure provide a method for multi-path interference detection. The method includes receiving, by a positioning device, a satellite signal transmitted from a satellite. The satellite signal carries a ranging code. Further, the method includes locking an internal code generated by the positioning device to the ranging code, determining characteristics of correlations between the satellite signal and the internal code with different time shifts, and detecting satellite signal deterioration due to multi-path interference based on the characteristics of the correlations between the satellite signal and the internal code with different time shifts.

18 Claims, 4 Drawing Sheets

METHOD AND APPARATUS FOR MULTIPATH DETECTION

INCORPORATION BY REFERENCE

This present disclosure claims the benefit of U.S. Provisional Application No. 62/196,420, "METHOD AND APPARATUS FOR GPS MULTIPATH DETECTION" filed on Jul. 24, 2015, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A satellite based positioning device receives satellite signals from at least four satellites to determine a position of the device. Generally, the satellite based positioning device requires a direct line of sight reception of the satellite signals to achieve a relatively high accuracy. In an example, the satellite based positioning device receives reflections of the satellite signals, for example due to reflections by buildings and the like, the accuracy of the position suffers due to interference of the reflections to the direct line of sight reception of the satellite signals.

SUMMARY

Aspects of the disclosure provide a method for multi-path interference detection. The method includes receiving, by a positioning device, a satellite signal transmitted from a satellite. The satellite signal carries a ranging code. Further, the method includes locking an internal code generated by the positioning device to the ranging code, determining characteristics of correlations between the satellite signal and the internal code with different time shifts, and detecting satellite signal deterioration due to multi-path interference based on the characteristics of the correlations between the satellite signal and the internal code with different time shifts.

According to an aspect of the disclosure, to determine the characteristics of the correlations between the satellite signal and the internal code with the different time shifts, the method includes determining a first parameter that is indicative of a symmetric characteristic of the correlations and determining a second parameter that is indicative of a distortion from a reference correlation characteristic without multi-path interference.

Further, in an embodiment, the method includes determining the signal strength of a direct line of sight component in the satellite signal, and determining thresholds for the first parameter and the second parameter based on the signal strength when the signal strength is higher than a first threshold.

In an example, the method includes storing second thresholds for the first parameter and third thresholds for the second parameter in association with levels of the signal strength. Then, the method includes determining a second threshold for the first parameter and a third threshold for the second parameter based on the stored second thresholds and the third threshold in association with the levels of the signal strength.

In an embodiment, the method includes calculating a prompt correlation between the satellite signal and the internal code without time shifting, calculating early correlations between the satellite signal and the internal code shifted in early time, calculating late correlation between the satellite signal and the internal code shifted in late time and calculating the first parameter and the second parameter as functions of the prompt correlation, the early correlations and the late correlations. In an example, the method includes applying a smooth filter to the first parameter and the second parameter to remove noise.

In an embodiment, the method also includes calibrating the positioning device to determine the second thresholds and the third thresholds in association with the levels of the signal strength.

According to an aspect of the disclosure, the method also includes determining a weight for weighting a measurement of the satellite signal based on the characteristics of the correlation.

Aspects of the disclosure provide an apparatus that includes a receiving circuit and a multi-path detector. The receiving circuit is configured to receive a satellite signal transmitted from a satellite that carries a ranging code, generate an internal code and lock the internal code to the ranging code. The multi-path detector is configured to determine characteristics of correlations between the satellite signal and the internal code with time shifts, and detect satellite signal deterioration due to multi-path interference based on the characteristics of the correlations between the satellite signal and the internal code with time shifts.

Aspects of the disclosure provide a non-transitory computer readable medium storing program instructions for causing a processor to execute operations for positioning. The operations include receiving correlations between a satellite signal and an internal code with different time shifts. The internal code is locked to a ranging code carried in the satellite signal. Further, the operations include determining characteristics of the correlations between the satellite signal and the internal code with different time shifts, and detecting satellite signal deterioration due to multi-path interference based on the characteristics of the correlations between the satellite signal and the internal code with different time shifts.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
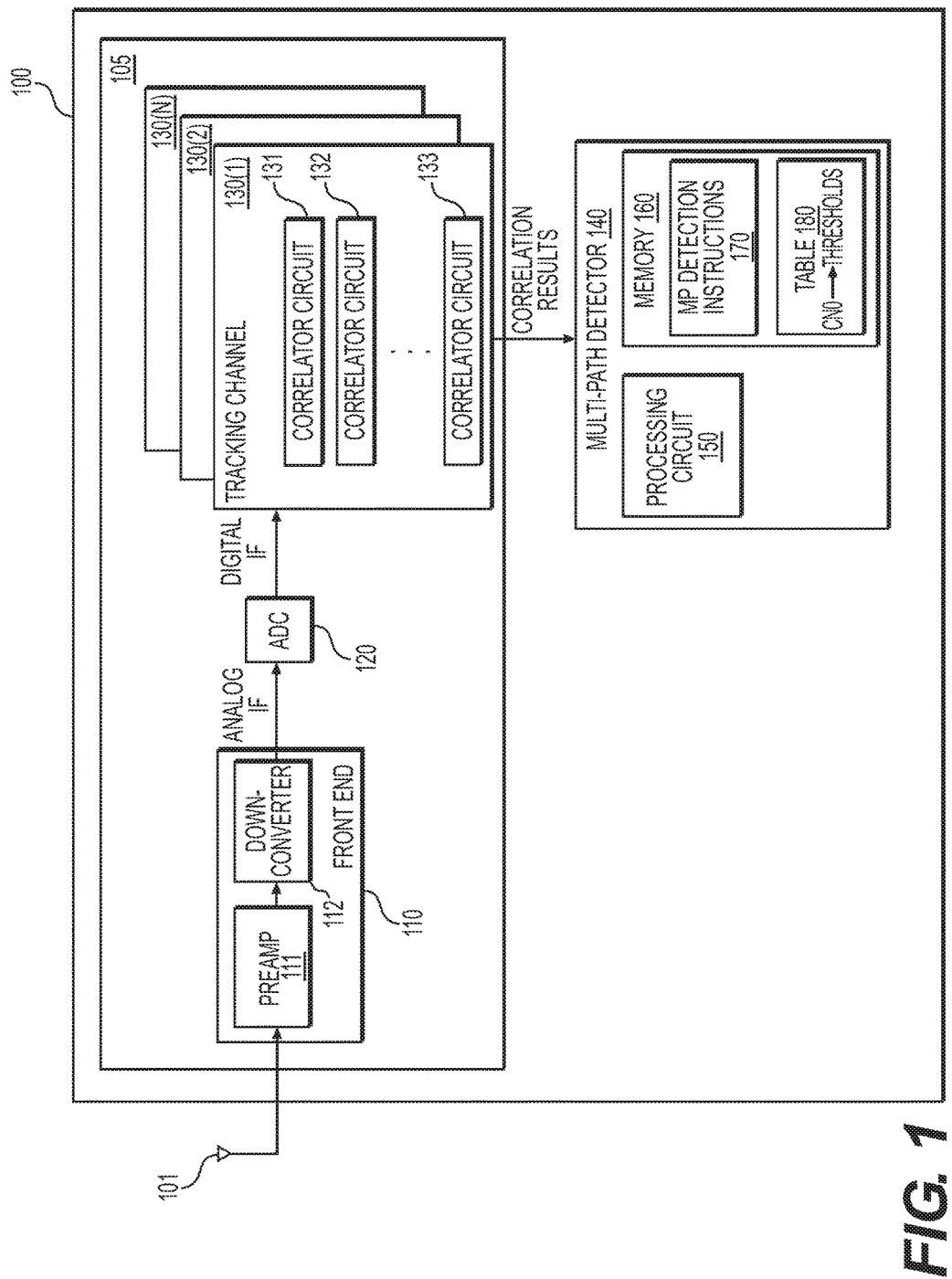
FIG. 1 shows a block diagram of an electronic device 100 according to an embodiment of the disclosure.

FIG. 1 shows a block diagram of an electronic device 100 according to an embodiment of the disclosure. The electronic device 100 is configured to receive satellite positioning signals that include a direct line of sight component and possible reflection components that interfere with the direct line of sight component. The interference of the reflection components to the direct line of sight component is referred to as multi-path interference. The electronic device 100 is configured to perform correlation measurements. Based on the correlation measurements, the electronic device 100 determines signal strength of the direct line of sight component, and determines a gauge standard at the signal strength for detecting multi-path interference. Then, the electronic device 100 uses the gauge standard to detect the multi-path interference.

The electronic device 100 can be any suitable device, such as a tablet computer, a smart phone, a camera, a wearable device, a handheld global positioning system (GPS) device, a vehicle mountable GPS device, and the like. The electronic device 100 includes a satellite signal receiver 105 configured to receive satellite positioning signals transmitted by a satellite system, such as the Global Positioning System (GPS), the GLObalnaja NAvigatsionnaja Sputnikovaja Sistema (GLONASS) satellite system, the Galileo navigation satellite system, the Beidou navigation satellite system, and the like. Based on the satellite positioning signals, the electronic device 100 determines a position of the electronic device 100.

Specifically, in the FIG. 1 example, the satellite signal receiver 105 includes receiving circuits, such as a front end processing circuit 110, an analog to digital converter (ADC) 120, a plurality of tracking channels 130 and the like. The electronic device 100 further includes a multi-path detector 140 coupled with the satellite signal receiver 105 as shown in FIG. 1.

The front end processing circuit 110 is coupled to an antenna 101. The antenna 101 is configured to receive satellite positioning signals. In an example, satellites respectively broadcast radio frequency signals (satellite positioning signals) to carry information for satellite based positioning, such as ranging codes that are pseudo random noise (PRN) codes and are used to measure distance to the satellites, navigation messages that can be used to calculate position of the satellites in orbit, information of time and status of the satellites, and the like. The antenna 101 is configured to generate electrical signals in response to the radio frequency signals in the air. It is noted that the radio frequency signals received by the antenna 101 can include direct line of sight radio frequency signals from the satellites and reflections of the radio frequency signals due to, for example buildings, and the like.

The front end processing circuit 110 includes various analog circuits, such as amplifier, filter, down-converter, and the like, to process the electrical signals. In the FIG. 1 example, the front end processing circuit 110 includes a pre-amplifier 111 to amplify the electrical signals to an appropriate level and includes a down-converter 112 to down-convert a radio frequency signal to an analog intermediate frequency (IF) signal, for example. The ADC 120 is configured to sample the analog IF signal, and convert the sampled analog IF signal to a digital IF signal.

The tracking channels 130 are configured to track the digital IF signals, and demodulate the digital IF signals to extract the information carried in the satellite positioning signals. In an embodiment, the satellite signal receiver 105 includes four or more tracking channels 130 respectively corresponding to four or more satellites. Each tracking channel 130 is configured to extract the information carried in the satellite positioning signal transmitted from the corresponding satellite.

According to an aspect of the disclosure, a tracking channel 130 includes a plurality of correlator circuits 131-133. Each of the correlator circuits 131-133 is configured to calculate correlations between two data series. In an embodiment, the tracking channel 130 includes a PRN generator (not shown), and a synchronization controller (not shown) coupled with the plurality of correlator circuits 131-133 to form a code tracking loop to align an internal PRN code with the PRN code carried in the satellite positioning signal. For example, the PRN generator generates the internal PRN code with different offsets (e.g., time offset, phase offset, frequency offset). The PRN code with different offsets are respectively provided to the correlator circuits 131-133. The correlator circuits 131-133 respectively calculate correlations between the digital IF signal and the internal PRN code with different offsets. Based on the correlations, the synchronization controller determines an adjustment to the PRN generator in order to lock the internal PRN code with the PRN code carried in the satellite position signal. In an example, the synchronization controller determines the adjustment to the PRN generator to maximize a correlation in order to lock the internal PRN code with the PRN code carried in the satellite position signal.

In an embodiment, the correlations calculated by the correlator circuits 131-133 include a very-early correlation (E1), an early correlation (E0), a prompt correlation (P), a late correlation (L0), and a very late correlation (L1). In an example, the prompt correlation is the correlation between the digital IF signal and internal PRN code with no offset; the early correlation (E0) is the correlation between the digital IF signal and the internal PRN code with negative 0.25 chip offset (negative 0.25 chip time shift); the late correlation (L0) is the correlation between the digital IF signal the internal PRN code with positive 0.25 chip offset (positive 0.25 chip time shift); the very-early correlation (E1) is the correlation between the digital IF signal and the internal PRN code with negative 0.5 chip offset (negative 0.5 chip time shift); and the very late correlation (L1) is the correlation between the digital IF signal the internal PRN code with positive 0.5 chip offset (positive 0.5 chip time shift). In the example, one chip is the time difference of two neighboring bits in the PRN code.

According to an aspect of the disclosure, when the internal PRN code and the PRN code carried in the direct line of sight reception of the satellite position signal are aligned, the prompt correlation has a maximum value. Thus, in an embodiment, the code tracking loop is configured to maximize the prompt correlation, thus the internal PRN code is aligned with the PRN code carried in direct line of sight reception of the satellite positioning signals. In the embodiment, the code tracking loop is configured to keep the internal PRN code to be aligned with the PRN code carried in the direct line of sight reception of the satellite positioning signals, thus the internal PRN code is locked to the PRN code carried in the direct line of sight reception of the satellite positioning signals.

According to an aspect of the disclosure, when the internal PRN code is aligned with the PRN code carried in the direct line of sight reception of the satellite positioning signals, and the satellite positioning signals are not affected by interference, the correlation results have specific characteristics, and when the satellite positioning signals are affected by for example the multi-path interference, the correlation result shift from the specific characteristics. For example, in an ideal situation without interference, and when the internal PRN code is aligned with the PRN code carried in the direct line of sight reception of the satellite positioning signals, the early correlations (E0 and E1) and the late correlations (L0 and L1) are about symmetric to the prompt correlation and have reduced values from the prompt correlation.

Figure 2:
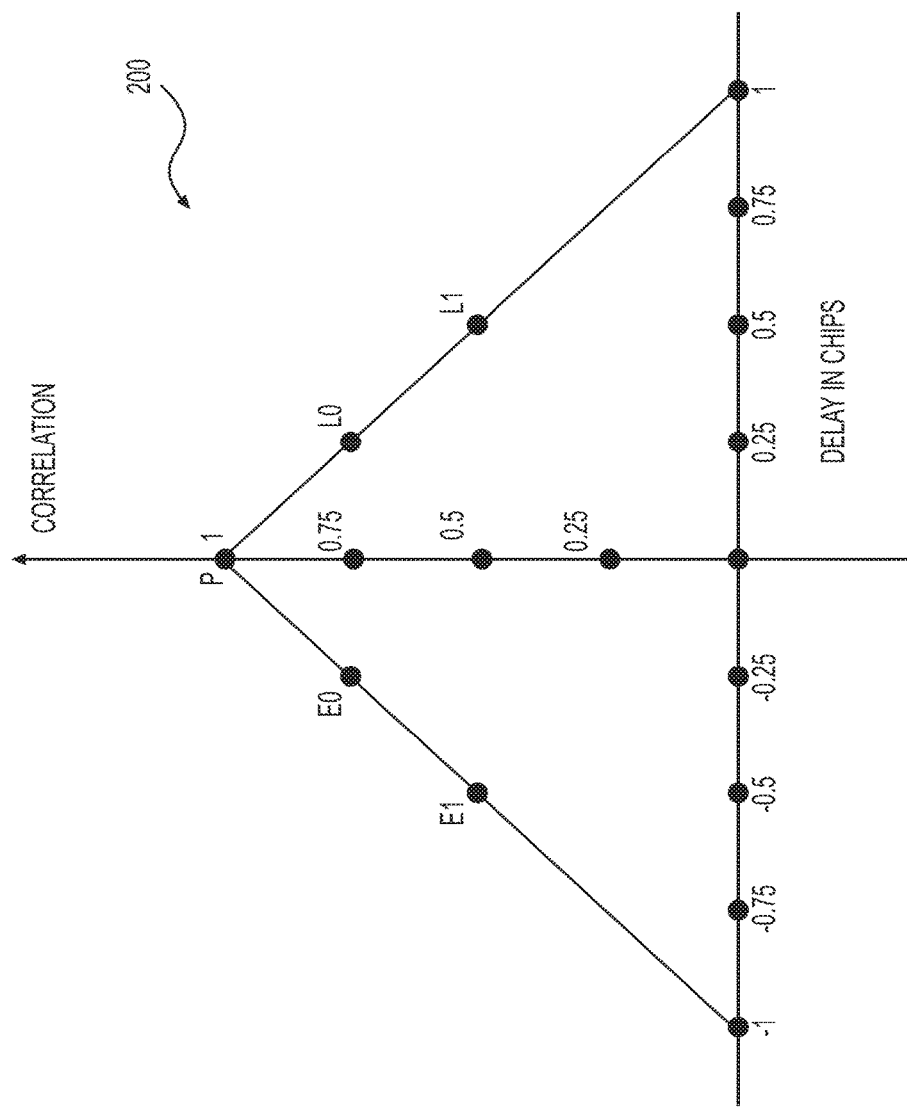
FIG. 2 shows a plot 200 of correlation characteristic according to an embodiment of the disclosure.

FIG. 2 shows a plot 200 of correlation characteristics in an ideal situation. In the FIG. 2 example, X-axis represents time shifts of internal PRN code, such as delay in chips, and the Y-axis represents values of correlation. As seen in FIG. 2, the prompt correlation (P) is about 1, the early correlation (E0) is about 0.75, the late correlation (L0) is about 0.75, the very early correlation (E1) is about 0.5, and the very late correlation (L1) is about 0.5.

Further, when the satellite positioning signal received by the electronic device 100 includes reflection components, the correlation results shift from the ideal situation. According to an aspect of the disclosure, due to the reflection components that have delay to the line of sight component, the early correlations and the late correlations are not symmetric to the prompt correction. In an example, the late correlations have higher value than the early correlations. Thus, in an embodiment, the characteristics of the correlations are determined and used to detect multi-path interference.

In the FIG. 1 example, the correlation results from the correlator circuits 131-133 are provided to the multi-path detector 140 to detect multi-path interference. It is noted that, in the FIG. 1 example, the correlation results provided to the multi-path detector 140 are generated by the correlator circuits 131-133 that already exist in the track channels 130, thus no additional correlation circuits are needed. In another example, dedicated correlation circuits can be used to calculate the correlation results for detecting multi-path interference.

The multi-path detector 140 is configured to receive the correlation results, calculate parameters that are indicative of the correlation characteristics, such as a symmetric characteristic of the correlation results, a distortion of the correlation results, and the like, and to detect the multi-path interference based on the correlation characteristics. The multi-path detector 140 is implemented using any suitable technology.

In the FIG. 1 example, the multi-path detector 140 includes a processing circuit 150 and a memory 160. The processing circuit 150 is implemented using suitable technology. In an embodiment, the processing circuit 150 is implemented using a processor, such as a central processing unit (CPU), and the like, configured to execute software instructions. The memory 160 stores software instructions to be executed by the processing circuit 150, and stores data to be processed. In the FIG. 1 example, the memory 160 stores instructions 170 for multi-path detection and stores a table 180 configured to associate gauge standards with levels of signal strength. The memory 160 includes any suitable memory storage device, such as read only memory (ROM), random access memory (RAM), dynamic random access memory (DRAM), static random access memory (SRAM), electrically programmable read only memory (EPROM), flash memory, hard disk drive, optical disc, solid state drive, and the like. In an embodiment, the processing circuit 150 executes the instructions 170 and uses the table 180 to detect multi-path interference.

Specifically, in an embodiment, the processing circuit 150 is configured to calculate a signal strength based on the prompt correlation results. For example, the signal strength is represented using carrier-to-receiver noise density (CN0). In an example, the carrier-to-receiver noise density is calculated based on the prompt correlation results. For example, the carrier-to-receiver noise density is calculated according to Eq. 1:

$$CN0 = \frac{C}{kT} \qquad \text{Eq. 1}$$

where C denotes to the received carrier power in watts and is calculated as a function of the prompt correlation results; k denotes to Boltzmann constant in joules per kelvin, and T denotes to the receiver noise temperature in kelvins.

Then the processing circuit 150 determines whether the signal strength is large enough for further detection processing. For example, the processing circuit 150 determines whether the carrier-to-receiver noise density is above a signal strength threshold (TH1). In an example, the signal strength threshold (TH1) depends on the sensitivity of the code tracking loop in the tracking channel 130. For example, when the sensitivity of the code tracking loop in the tracking channel 130 is 15 dBHz, the signal strength threshold (TH1) is 15 dBHz in an example. When the carrier-to-receiver noise density is above the signal strength threshold, the processing circuit 150 further determines correlation characteristics. In an embodiment, the processing circuit 150 calculates values for a first parameter H1 and a second parameter H2 according to Eq. 2 and Eq. 3:

$$H1 = \text{abs}\left(\frac{E0}{L0} - 1\right) + \text{abs}\left(\frac{E1}{E2} - 1\right) \qquad \text{Eq. 2}$$

$$H2 = \text{abs}\left(\frac{E1 + E0 + L0 + L1}{P} - C1 - C2\right) \qquad \text{Eq. 3}$$

where C1 and C2 are predetermined values that depend on bandwidth.

In an example, the first parameter H1 is indicative of a symmetric characteristic of the correlation results. For example, when the correlation results are symmetric, E0 is about the same as L0, and E1 is about the same as L1, thus, the value of the first parameter H1 is about zero. When the correlation results are not symmetric due to, for example, multi-path interference, E0 is relatively smaller than L0, and the E1 is relatively smaller than L1, thus the first parameter H1 is larger than zero. Further, when the multi-path interference becomes larger, the value of the first parameter H1 increases.

Further, the second parameter H2 is indicative of a distortion of the correlation results from a reference characteristic. In an example, C1 is the nominal value of $$\frac{E0 + L0}{P},$$

and C2 is the nominal value of $$\frac{E1 + L1}{P}$$

when the received radio frequency signal is not affected by the multi-path interference (e.g., no reflection components).

In an example, without bandwidth limitation, C1 is about 1, and C2 is about 1.5. However, the values of C1 and C2 are affected by the bandwidth of the front end processing circuit 110. In an example, the values of C1 and C2 are predetermined according to a calibration process to the satellite signal receiver 105.

In a calibration example, a pure GNSS signal (e.g., without interference) of −130 dBm is generated by a simulator and inputted into the satellite signal receiver 105, and then the values of C1 and C2 are calculated as mean values of a plurality of correlation measurements, such as shown by Eq. 4 and Eq. 5.

$$C1 = \text{mean}\left(\frac{E0 + L0}{P}\right) \quad \text{Eq. 4}$$

$$C2 = \text{mean}\left(\frac{E1 + L1}{P}\right) \quad \text{Eq. 5}$$

In an example, when the received radio frequency signal is not affected by interference, the value of second parameter H2 is about zero. When the received radio frequency signal is affected by interference, the prompt correlation (P) decreases, and the late correlations increase, thus the value of H2 is larger than zero. When the interference becomes larger, the value of second parameter H2 increases.

According to an aspect of the disclosure, the processing circuit 150 determines thresholds for the first parameter H1 and the second parameter H2 based on signal strength.

In an embodiment, the table 180 stores second thresholds (TH2) for the first parameter H1 and third thresholds (TH3) for the second parameter H2 associated with the signal strength, such as levels of carrier-to-receiver noise density (CN0). The processing circuit 150 searches the table 180 to determine the second threshold TH2 and the third threshold TH3 that are associated with the value of the carrier-to-receiver noise density (CN0). In an embodiment, when the value of CN0 is between two adjacent levels, the second threshold TH2 and the third threshold TH3 are calculated according to interpolation of the two adjacent levels.

In some embodiments, the processing circuit 150 uses other suitable technique, such as polynomial functions, and the like to determine the thresholds for the for the first parameter H1 and the second parameter H2 based on signal strength.

According to an aspect of the disclosure, the processing circuit 150 compares the value of first parameter H1 to the second threshold TH2, and compares the value of second parameter H2 to the third threshold TH3 to detect multi-path interference.

Further, in an embodiment, the processing circuit 150 determines a level of multi-path interference based on the values of first parameter H1 and the second parameter H2. Additional, in an example, the processing circuit 150 determines a weight for measurements of the satellite positioning signal based on the values of the first parameter H1 and the second parameter H2. For example, when values of first parameter H1 and the second parameter H2 of a measurement for a RF signal are relatively large, the processing circuit 150 determines to use a relatively small weight for the measurement to de-weight the measurement or determines to abandon the measurement (or use zero as the weight); and when values of first parameter H1 and the second parameter H2 of a measurement for a RF signal are relatively small, the processing circuit 150 determines to use a relatively large weight for the measurement.

It is noted that in an embodiment, the satellite signal receiver 105 and the multiple path detector 140 are integrated on an integrated circuit (IC) chip. In another embodiment, the satellite signal receiver 105 and the multi-path detector 140 are integrated on different IC chips.

Figure 3:
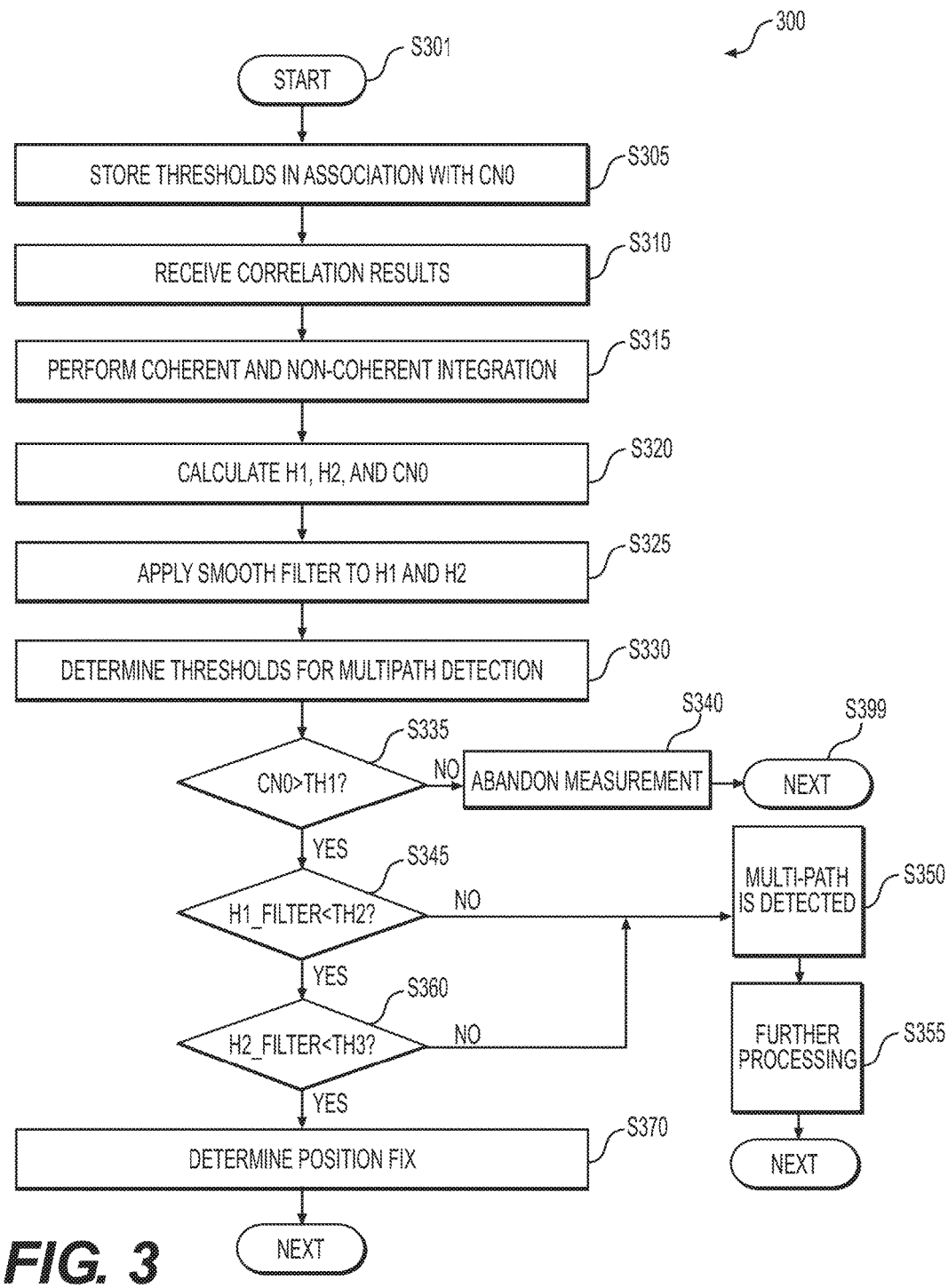
FIG. 3 shows a flow chart outlining a process 300 to determine a position according to an embodiment of the disclosure.

FIG. 3 shows a flow chart outlining a process 300 to determine a position fix according to an embodiment of the disclosure. In an example, the process 300 is executed by the multi-path detector 140 in the FIG. 1 example. The process starts at S301 and proceeds to S305.

At S305, thresholds in association with signal strengths are stored. In the FIG. 1 example, the memory 160 stores the table 180. The table 180 associates the second thresholds (TH2) for the first parameter H1 and the third thresholds (TH3) for the second parameter H2 in association with levels of signal strength, such as levels of carrier-to-receiver noise density (CN0).

At S310, correlation results are received. In the FIG. 1 example, each of the tracking channels 130(1)-130(N) includes a code tracking loop having a plurality of correlator circuits 131-133. In an example, the correlator circuits 131-133 respectively calculate the very-early correlation (E1), the early correlation (E0), the prompt correlation (P), the late correlation (L0), and the very late correlation (L1). In an example, the code tracking loop is configured to maximize the prompt correlation in order to align the internal PRN code with the PRN code carried in the direct line of sight reception of the satellite signal. The correlation results calculated by the correlator circuits 131-133 are then provided to the multi-path detector 140.

At S315, coherent and non-coherent integrations are performed. In the FIG. 1 example, the correlation results are in the complex format, and the multi-path detector 140 performs coherent integration of the correlation results over a coherent time. In an example, coherent integration is an integration performed on the correlation results in the complex format, so that both amplitude and phase of the correlation results are used. In an example, coherent time is limited to twenty milliseconds because navigation bit length is twenty milliseconds. After coherent integration, the multi-path detector 140 performs non-coherent integration to improve sensitivity. In an example, non-coherent integration is an integration performed on the amplitude of the correlation results, and the phase information is discarded. In an example, the total integration time for both the coherent integration and the non-coherent integration is one second or even longer.

At S320, values of the first parameter H1 and the second parameter H2 are calculated and the signal strength is calculated. In the FIG. 1 example, using the correlation results after non-coherent integration, the multi-path detector 140 calculates the first parameter H1 according to Eq. 1 and calculates the second parameter H2 according to Eq. 3. In an embodiment, C1 and C2 are pre-determined, for example, by a calibration of the satellite signal receiver 105 and are stored in the memory 160. The multi-path detector 140 also calculates the signal strength (e.g., CN0) based on the prompt correlation results after non-coherent integration.

At S325, smooth filters are applied to the first parameter H1 and the second parameter H2. In the FIG. 1 example, the multi-path detector 140 calculates a series of H1 values, for example H1(1), H1(2), . . . , H1(n), . . . , and calculates a series of H2 values, for example H2(1), H2(2), . . . , H2(n), . . . , then the multi-path detector 140 applies filtering functions to the parameters H1 and H2 according to Eq. 6 and Eq. 7:

$$H1\_FILTER(n)=(1-\alpha)\times H1\_FILTER(n-1)+\alpha\times H1(n) \quad \text{Eq. 6}$$

$$H2\_FILTER(n)=(1-\alpha)\times H2\_FILTER(n-1)+\alpha\times H2(n) \quad \text{Eq. 7}$$

where H1_FILTER(1)=H1(1) and H2_FILTER(1)=H2(1).

At S330, thresholds for multi-path detection are determined. In the FIG. 1 example, based on the value of CN0, the multi-path detector 140 searches the table 180 to determine the second threshold TH2 and the third threshold TH3 corresponding to the value of CN0. In an embodiment, when the value of CN0 is between two adjacent levels, the second threshold TH2 and the third threshold TH3 are calculated according to interpolation of the two adjacent levels.

At S335, the carrier-to-receiver noise density CN0 is compared with the first threshold TH1. When the carrier-to-receiver noise density CN0 is higher than the first threshold TH1, the process proceeds to S340; otherwise, the process proceeds to S345.

At S340, the measurement is abandoned due to poor signal quality. Then the multi-path detector 140 processes a next measurement. For example, the process returns to S320 to calculate the first parameter H1, the second parameter H2 and the carrier-to-receiver noise density CN0 for a next measurement.

At S345, the filtered value H1_FILTER is compared with the second threshold TH2. When the filtered value H1_FILTER is larger than the second threshold TH2, the process proceeds to S350; otherwise the process proceeds to S355.

At S350, the multi-path interference is detected. Thus, the present measurement is affected by multi-path interference.

At S355, further processing is performed. In an example, the multi-path detector 140 determines weight for weighting the present measurement based on the value of the H1_FILTER. Then, in an example, the process proceeds to a next measurement.

At S360, the filtered value H2_FILTER is compared with the third threshold TH3. When the filtered value H2_FILTER is larger than the third threshold TH3, the process proceeds to S350; otherwise the process proceeds to S370.

At S370, the present measurement is used for determining a position fix with other suitable data. Then, in an example, the process proceeds to a next measurement.

Figure 4:
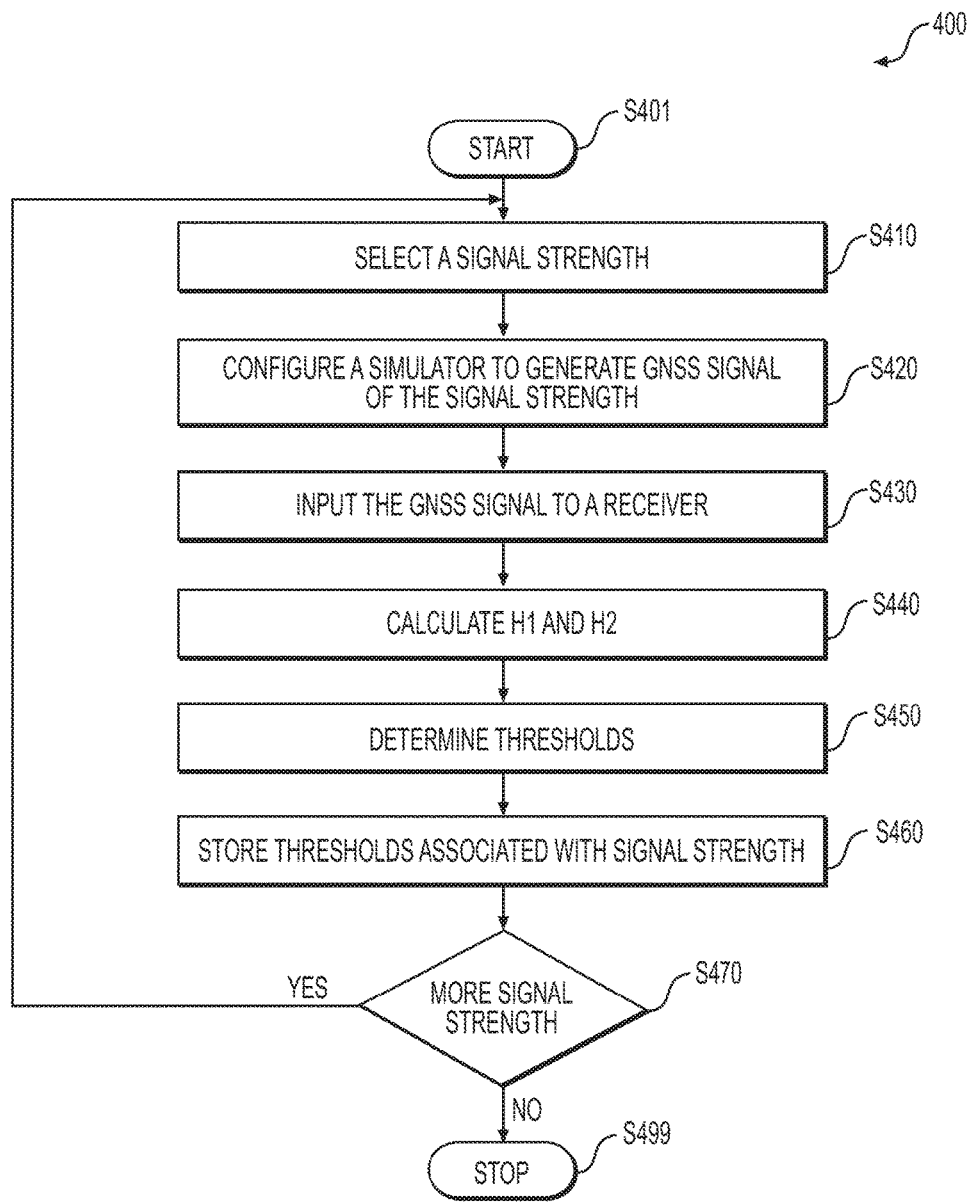
FIG. 4 shows a flow chart outlining a process 400 to calibrate an electronic device according to an embodiment of the disclosure.

FIG. 4 shows a flow chart outlining a process 400 to calibrate an electronic device according to an embodiment of the disclosure. In an example, the process 400 is performed on an electronic device, such as the electronic device 100, before the electronic device 100 is sold to a customer. The process starts at S401 and proceeds to S410.

At S410, a signal strength, such as a level of CN0, is selected. In an example, the signal strength is selected from 15 dBHz to 40 dBHz with a step of 5 dBHz.

At S420, a simulator is configured to generate GNSS signal of the signal strength.

At S430, the GNSS signal is input to the satellite signal receiver 105.

At S440, the parameters H1 and H2 are calculated based on correlations. For example, the multi-path detector 140 calculates the parameters H1 and H2 similarly to the step 320.

At S450, thresholds are determined based on the values of the parameters H1 and H2. In an example, the multi-path detector 140 calculates multiple values of the first parameter H1, and calculates multiple values of the second parameter H2. Then, the multi-path detector 140 determines the second threshold TH2 and the third threshold TH3 according to Eq. 8 and Eq. 9:

$$TH2=\max(H1)-\min(H1) \quad \text{Eq. 8}$$

$$TH3=\max(H2)-\min(H2) \quad \text{Eq. 9}$$

At S460, the thresholds are stored in association with the signal strength. For example, the multi-path detector 140 stores the second threshold TH2 and the third threshold TH2 in association with the signal level (e.g., CN0).

At S470, when there is additional level of signal strength, the process returns to S410; otherwise, the process proceeds to S499 and terminates.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for multi-path detection, the method comprising:
   receiving, by a positioning device, a satellite signal transmitted from a satellite, the satellite signal carrying a ranging code;
   locking an internal code generated by the positioning device to the ranging code;
   determining characteristics of correlations between the satellite signal and the internal code with time shifts;
   detecting satellite signal deterioration due to a multi-path interference based on the characteristics of the correlations between the satellite signal and the internal code with time shifts;
   determining a first parameter that is indicative of a symmetric characteristic of the correlations; and
   determining a second parameter that is indicative of a distortion from a correlation characteristic without the multi-path interference.

2. The method of claim 1, further comprising:
   determining a signal strength of a direct line of sight component in the satellite signal; and
   determining thresholds for the first parameter and the second parameter based on the signal strength when the signal strength is higher than a first threshold.

3. The method of claim 2, further comprising:
   storing second thresholds for the first parameter and third thresholds for the second parameter in association with levels of the signal strength.

4. The method of claim 3, wherein determining the thresholds for the first parameter and the second parameter based on the signal strength when the signal strength is higher than the first threshold:
   determining a second threshold for the first parameter and a third threshold for the second parameter based on the stored second thresholds and the third threshold in association with the levels of the signal strength.

5. The method of claim 1, further comprising:
   calculating a prompt correlation between the satellite signal and the internal code without time shifting;
   calculating early correlations between the satellite signal and the internal code shifted to early time;
   calculating late correlation between the satellite signal and the internal code shifted to late time; and calculating the first parameter and the second parameter as functions of the prompt correlation, the early correlations and the late correlations.

6. The method of claim 5, further comprising:
applying a smooth filter to the first parameter and the second parameter to remove noise.

7. The method of claim 3, further comprising:
calibrating the positioning device to determine the second thresholds and the third thresholds in association with the levels of the signal strength.

8. The method of claim 1, further comprising:
determining a weight for weighting a measurement of the satellite signal based on the characteristics of the correlations.

9. An apparatus, comprising:
a receiving circuit configured to receive a satellite signal transmitted from a satellite that carries a ranging code, generate an internal code and lock the internal code to the ranging code; and
a multi-path detector configured to determine characteristics of correlations between the satellite signal and the internal code with time shifts, detect satellite signal deterioration due to a multi-path interference based on the characteristics of the correlations between the satellite signal and the internal code with the time shifts, determine a first parameter that is indicative of a symmetric characteristic of the correlations, and determine a second parameter that is indicative of a distortion from a correlation characteristic without the multi-path interference.

10. The apparatus of claim 9, wherein the multi-path detector is configured to:
determine a signal strength of a direct line of sight component in the satellite signal; and
determine thresholds for the first parameter and the second parameter based on the signal strength when the signal strength is higher than a first threshold.

11. The apparatus of claim 10, wherein the multi-path detector comprises:
a memory configured to store second thresholds for the first parameter and third thresholds for the second parameter in association with levels of the signal strength.

12. The apparatus of claim 11, wherein the multi-path detector is configured to:
determine a second threshold for the first parameter and a third threshold for the second parameter based on the stored second thresholds and the third threshold in association with the levels of the signal strength.

13. The apparatus of claim 9, wherein the receiving circuit comprises:
correlator circuits configured to:
calculate a prompt correlation between the satellite signal and the internal code without time shifting;
calculate early correlations between the satellite signal and the internal code shifted to early time; and
calculate late correlation between the satellite signal and the internal code shifted to late time.

14. The apparatus of claim 13, wherein the multi-path detector is configured to
calculate the first parameter and the second parameter as functions of the prompt correlation, the early correlations and the late correlations.

15. The apparatus of claim 14, wherein the multi-path detector is configured to
apply a smooth filter to the first parameter and the second parameter to remove noise.

16. The apparatus of claim 9, wherein the multi-path detector is configured to determine a weight for weighting a measurement of the satellite signal based on the characteristics of the correlations.

17. A non-transitory computer readable medium storing program instructions for causing a processor to execute operations for positioning, the operations comprising:
receiving correlations between a satellite signal and an internal code with different time shifts, the internal code being locked to a ranging code carried in the satellite signal;
determining characteristics of the correlations between the satellite signal and the internal code with different time shifts;
detecting satellite signal deterioration due to a multi-path interference based on the characteristics of the correlations between the satellite signal and the internal code with different time shifts;
determining a first parameter that is indicative of a symmetric characteristic of the correlations; and
determining a second parameter that is indicative of a distortion from a correlation characteristic without the multi-path interference.

18. The non-transitory computer readable medium of claim 17, wherein the operations comprise:
determining a signal strength of a direct line of sight component in the satellite signal; and
determining a second threshold for the first parameter and a third threshold for the second parameter based on the signal strength.

* * * * *